United States Patent [19]

McGrew

[11] Patent Number: 4,629,282
[45] Date of Patent: Dec. 16, 1986

[54] DIFFRACTIVE COLOR AND TEXTURE EFFECTS FOR THE GRAPHIC ARTS

[76] Inventor: Stephen P. McGrew, 1718 Columbus Pl., Santa Clara, Calif. 95051

[21] Appl. No.: 314,553

[22] Filed: Feb. 8, 1982

Related U.S. Application Data

[63] Continuation-in-part of Ser. No. 203,563, Nov. 5, 1980, abandoned.

[51] Int. Cl.⁴ ............................................. G03H 1/20
[52] U.S. Cl. ..................................................... 350/3.7
[58] Field of Search ................................ 350/3.6–3.86

[56] References Cited

U.S. PATENT DOCUMENTS

| | | |
|---|---|---|
| 898,369 | 9/1908 | Ives . |
| 1,354,471 | 10/1920 | Doner . |
| 3,407,405 | 10/1968 | Hoadley . |
| 3,412,493 | 11/1968 | French .................... 283/85 |
| 3,546,374 | 12/1970 | Graser, Jr. . |
| 3,633,989 | 1/1972 | Benton . |
| 3,708,217 | 1/1973 | McMahon .................... 350/3.86 |
| 3,947,105 | 3/1976 | Smith . |
| 4,017,158 | 4/1977 | Booth . |
| 4,034,211 | 7/1977 | Horst et al. . |
| 4,155,627 | 5/1979 | Gale et al. .................... 350/162.19 |
| 4,179,182 | 12/1979 | Smith . |
| 4,244,633 | 1/1981 | Kellie . |

FOREIGN PATENT DOCUMENTS

| | | |
|---|---|---|
| 0043509 | 6/1981 | European Pat. Off. . |
| 3035684 | 9/1980 | Fed. Rep. of Germany . |
| 1384281 | 2/1975 | United Kingdom . |
| 1517840 | 11/1975 | United Kingdom . |

OTHER PUBLICATIONS

Okoshi, T., *Three-Dimensional Imaging Techniques*, pp. 362–364, Academic Press, 1976.
Collier, R. J. et al, *Optical Holography*, pp. 194–197, Academic Press, 1981.
Tamura, P. N., Applied Optics, vol. 17, No. 16, (Aug. 1978), pp. 2532–2536.
Benton, S. A., "White-Light Transmission/Reflection Holographic Imaging".
Tamura, P. N., "Pseudocolor Encoding of Holographic Images Using a Single Wavelength", Applied Optics, vol. 17, No. 16, pp. 2532–2536, 15 Aug. 1978.
Leith et al, "White Light Hologram Technique", Applied Optics, vol. 17, No. 20, pp. 3187 and 3188, dated 15 Oct. 78.

*Primary Examiner*—Bruce Y. Arnold
*Attorney, Agent, or Firm*—Seed and Berry

[57] ABSTRACT

A method of producing color and texture effects on a surface (210,400) without the use of pigments or actual texturing. Diffraction patterns generated by interference between two light beams (220,230) are recorded in a suitable high-resolution photographic material (210,400) and are used instead of paints or inks to provide desired color and texture effects in the various regions (440,530) of an artistic or decorative composition. The resulting composition (210,400) may contain spectrally pure or mixed colors and a wide range of static or dynamic textural illusions visible under a variety of lighting conditions.

4 Claims, 9 Drawing Figures

U.S. Patent   Dec. 16, 1986   Sheet 1 of 3   4,629,282
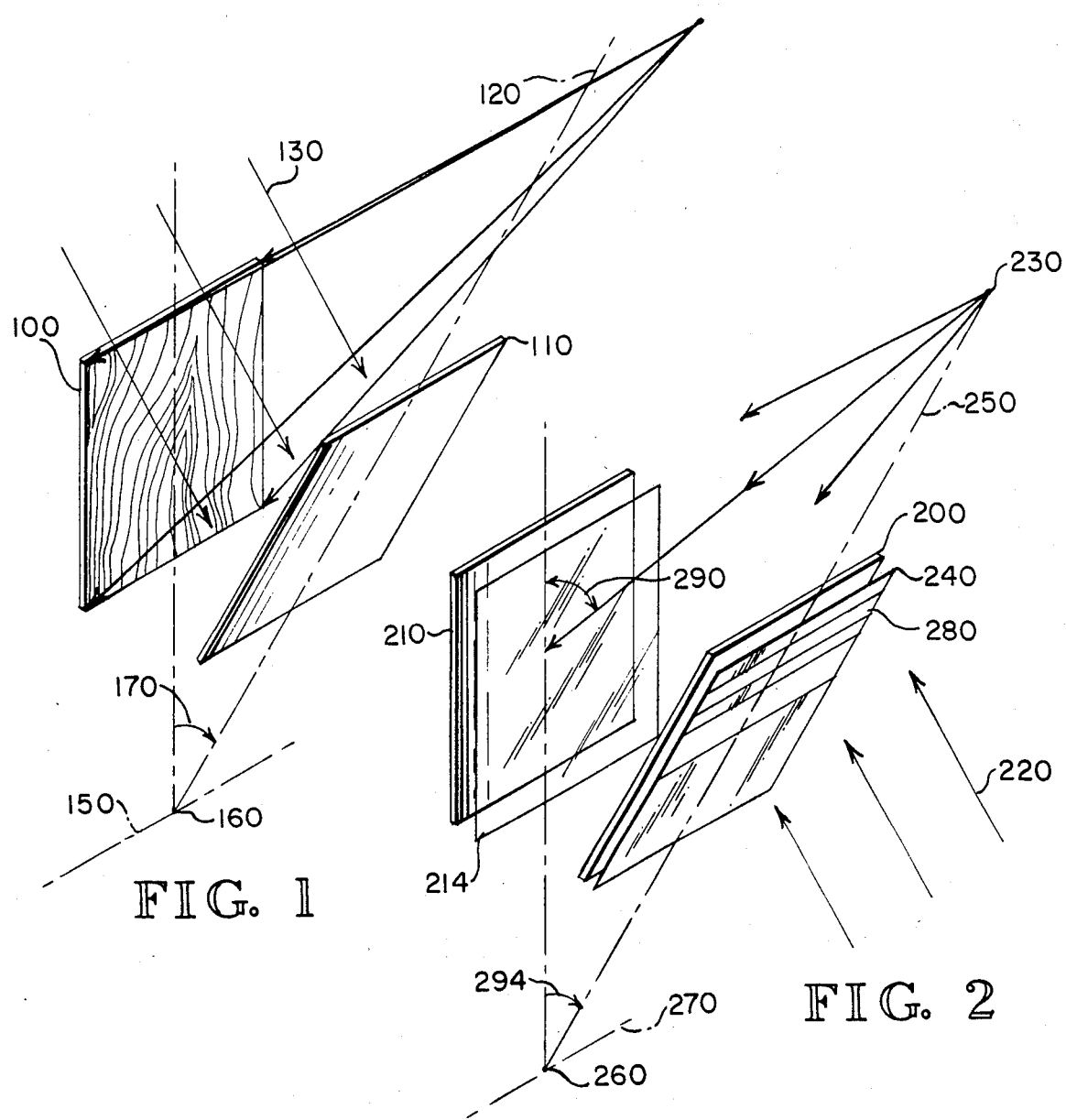
FIG. 1
FIG. 2
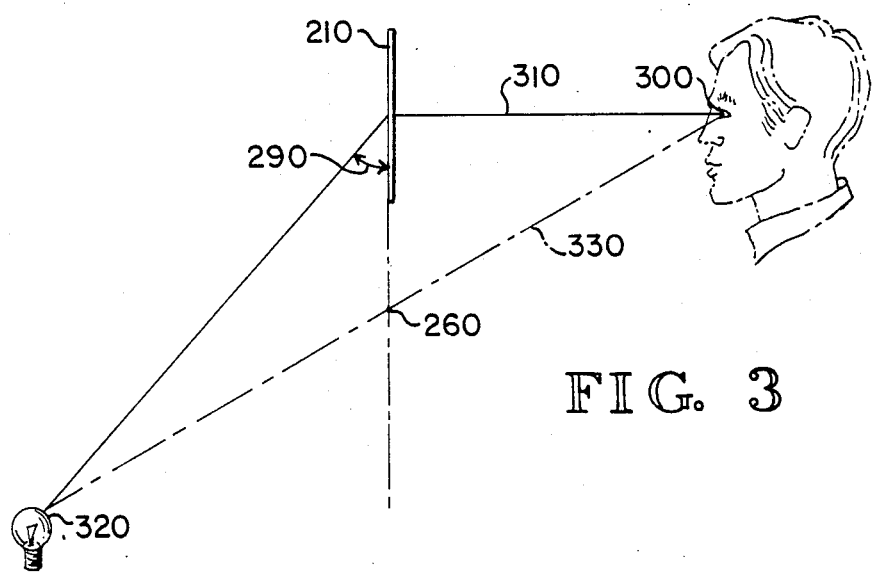
FIG. 3

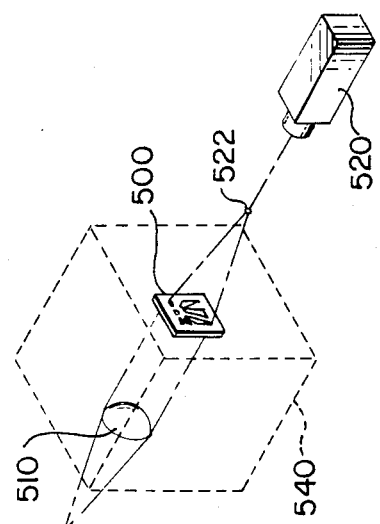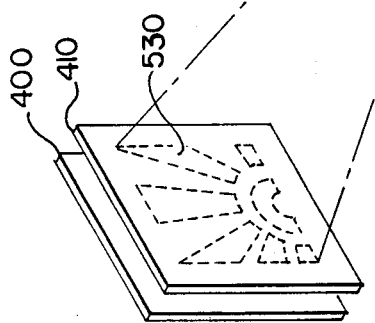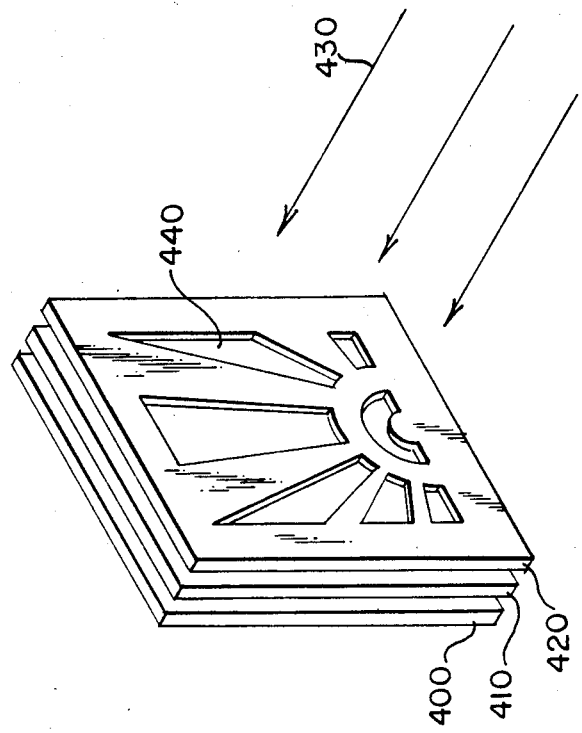

DIFFRACTIVE COLOR AND TEXTURE EFFECTS FOR THE GRAPHIC ARTS

DESCRIPTION

CROSS-REFERENCE TO PREVIOUS APPLICATION

This application is a continuation-in-part application of U.S. patent application Ser. No. 203,563, filed Nov. 5, 1980, now abandoned.

TECHNICAL FIELD

The invention relates to graphic arts, decorative use of optical diffraction, and holography. More particularly, the invention is directed to a method of using holographically generated diffraction patterns with predetermined properties to provide color and the illusion of texture and motion in artistic and decorative compositions.

BACKGROUND PRIOR ART

Holography has been used widely for the generation of diffraction gratings (U.S. Pat. No. 3,578,845) and three-dimensional images of objects and scenes (U.S. Pat. Nos. 3,506,327; 3,580,655; 3,758,186). To make a diffraction grating, the interference pattern formed by the interference between two or more mutually coherent optical wavefronts (usually one spherical or planar wavefront and another spherical, cylindrical, or planar wavefront) is recorded on a high-resolution optical recording medium, such as a Lippman emulsion, photopolymer, photoresist, or dichromated gelatin. Such gratings are used in spectrophotometers, heads-up displays, and other optical instruments.

To make a three-dimensional image, the interference pattern formed by the interference between a spherical or planar wavefront and a complex wavefront formed by the reflection of coherent light from the surface of an object (or by transmission of coherent light through an object) is recorded on a high-resolution photographic medium. Alternatively, a three-dimensional image may be synthesized as described in U.S. Pat. No. 4,206,965 by recording a large number of two-dimensional views of an object, in which case each individual recording step usually involves only the interference between a spherical or planar reference wavefront and a spherical, planar, or other wavefront carrying a two-dimensional image.

An improved form of holography to record threedimensional images, described in U.S. Pat. No. 3,633,989, reduces or eliminates all vertical parallax and thereby allows unblurred reconstruction with a white light source. As a consequence, the image appears in nearly pure spectral colors. Later extensions of the technique have included multiple images, each with different recording conditions to produce multicolored, three-dimensional images.

Radially symmetric, mechanically ruled diffraction gratings, especially spiral gratings, have been used to provide decorative color effects. Segments of spiral gratings have been joined to form diffractive mosaic patterns. These gratings and grating mosaics have been generated as surface relief patterns and have been replicated by thermoplastic embossing. The embossed grating mosaics have been used as substrates for printed graphics.

In some instances, simple, holographically generated diffraction gratings have been replicated by embossing and used as decorative material. In such instances, the diffraction gratings have been limited to low-frequency, very simple, nonrandom patterns incapable of providing the types of effects provided by the methods disclosed herein, such as selected arbitrary textural effects, predetermined uniform color effects, and the illusion of motion.

DISCLOSURE OF THE INVENTION

The present invention uses holographically generated diffractive patterns in the graphic arts (much as paint or colored inks have previously been used) to form artistic compositions and decorative patterns of predetermined color, apparent texture, and apparent motion. These compositions and patterns are not the three-dimensional images which are a goal of holography; they are confined to the surface they are made upon. No three-dimensionality beyond perhaps a slight depth of texture or a possible kinetic illusion of depth is to be expected.

A diffractive pattern of predetermined texture and motion is generated by first recording a conventional hologram of a flat object whose surface has the desired texture on a first holographic recording medium. The conventional hologram is coherently reconstructed in order to image the textured surface onto a second holographic recording medium. A reference beam is brought in to interfere with the reconstructed image and thereby form a second hologram on the second medium. An illusion of motion is produced when a mask with vertical apertures is placed between the conventional hologram and the reconstructed image, or in the light beam which reconstructs the conventional hologram. Any predetermined color may be produced by proper configuration of the reference beam relative to the conventional hologram and the second holographic medium, and by reconstructing selected regions of the conventional hologram to determine a desired color mix. A particular class of arrangements of reference beam, second recording medium, and conventional hologram provides the best results.

A diffractive pattern having a predetermined uniform color with minimal texture may be produced by substituting a fine random diffuser for the conventional hologram. Additional kinetic illusions are produced by using a coarse scatterer instead of a fine diffuser.

The diffractive patterns are used in any of several ways. First, a graphical composition may be made directly on the second holographic medium by placing a first mask upon the second holographic medium to limit a first exposure to certain areas, changing the mask and altering the setup to record a second diffractive pattern on a second set of predetermined areas, and continuing in this fashion until the desired composition is formed. The composition may then be replicated by contact printing, embossing, injection molding, or other suitable means.

Secondly, the diffractive patterns may be used to compose graphical designs by using the patterns themselves as contact printing masks. In this case, a third holographic recording medium is exposed through selected contactprintable diffractive patterns placed in contact, and exposure is limited to predetermined areas by a selected mask. Further exposures through further diffractive patterns and further masks are used to compose the desired graphical design.

Instead of using masks to limit exposure to predetermined areas, a conventional image projector may be used to project selected images onto selected diffractive patterns placed in contact with the third holographic recording medium and thereby compose a graphical design or multicolored image on the third medium.

Alternatively, graphical compositions may be formed by mechanically combining segments bearing various diffractive patterns.

An object of this invention is to provide a method of generating new and useful color, texture, and kinetic effects in graphical compositions.

Another object of this invention is to provide a system for producing colors without the use of pigments.

Another object of the invention is to provide means for easily composing graphical patterns incorporating diffractive effects, utilizing relatively simple and inexpensive equipment without the need for the complex and expensive equipment normally associated with holography.

Another object of the invention is to provide a method of producing graphical compositions which are difficult to counterfeit for use in validating documents, labels, stamps, currencies, identification cards, and other items whose value depends on their genuineness.

Other objects of the invention will, in part, be obvious and will, in part, appear hereafter.

BRIEF DESCRIPTION OF THE DRAWINGS

FIG. 1 is an isometric view showing a typical arrangement for making a conventional hologram to be used in making a textured diffractive pattern;

FIG. 2 is an isometric view showing a typical arrangement for making a diffractive pattern which will provide a predetermined color and textural effect;

FIG. 3 is a schematic showing a typical viewing arrangement for a graphical pattern or a diffractive pattern incorporating diffractive colors and textures;

FIG. 4 is an isometric view of a representative system for generating a diffractive graphical composition by projection contact printing.

FIG. 5 is an isometric view of a representative system for generating a diffractive graphical composition by the projection of a graphical pattern from a transparency.

BEST MODE FOR CARRYING OUT THE INVENTION

Figure 6:
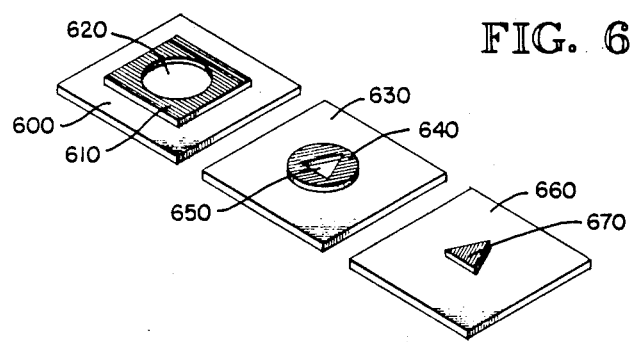
FIG. 6 is an isometric view of a set of embossing plates designed to form a diffractive graphical composition in three steps by hot stamping.

A first step involves production of conventional holograms of several different textured surfaces by the method shown in FIG. 1. Textured surface 100 is illuminated by laser light. Scattered light from surface 100 is incident upon holographic plate 110. Holographic plate 110 is illuminated by collimated laser light 130 derived from the same laser as light 120. Plate 110 is tilted with respect to surface 100 so that the extended planes of plate 110 and surface 100 intersect at line 150, whose center point is 160. The interference pattern formed by collimated light 130 and light scattered from surface 100 upon plate 110 is a conventional hologram of textured surface 100, with the exception that plate 110 is tilted at a preselected angle 170. The purpose of the tilt of plate 110 is explained in the following sections.

In the second step, a hologram such as recorded on plate 110 in FIG. 1 may be used in the setup shown in FIG. 2 to produce a diffractive pattern of any chosen color having the texture of the recorded surface (e.g., surface 100). In FIG. 2, the surface recorded in hologram 200 (e.g., surface 100 in hologram 110) is imaged onto the surface of holographic plate 210 by reconstructing hologram 200 with collimated laser light beam 220.

Light from the same laser source as beam 220 is diverged from point 230 to illuminate plate 210, thereby forming an interference pattern upon plate 210 comprising a hologram of the surface recorded in plate 200. Means such as mask 240 is employed to select the portions of hologram 200 contributing to the reconstruction of said surface. Point 230 is located on line 250, which is the line which passes through point 260 and the center of plate 200. Line 270 is the intersection of the extended planes of plate 200 and plate 210; point 260 is the midpoint of line 270.

The diffractive pattern on plate 210 is illuminated as indicated schematically in FIG. 3. At a position 300, which is found by extending a line 330 from light source 320 through point 260 (see FIG. 2) and finding the intersection of line 330 with line 310 extending normal to plate 210, the contribution of each horizontal strip 280 of hologram 200 defined by mask 240 will be a monochromatic image of the surface recorded in hologram 200. For best results, point 260 (FIGS. 2 and 3) corresponds to point 160 (FIG. 1). The particular color of the monochromatic image contribution depends on the color of laser light used in forming diffractive pattern 210 and the angular separation of point 230 and strip 280 as seen from the midpoint of plate 210. What is actually observed at point 300 is the superposition of substantially identical images of a textured surface, each image being in a different color. The result is a diffractive pattern having the texture of a surface and a color distribution determined by mask 240 of FIG. 2.

A complex mask 240 can produce a complex pattern of color distributions that change with different viewpoints. Plate 110 is tilted relative to plate 100 in FIG. 1 so that, according to FIG. 3, light source 320 can be located relatively close to plate 210. The diffractive pattern on plate 210, resulting from reconstructing only a thin horizontal strip of plate 200, will generate a monochromatic field at position 300. Each horizontal strip of plate 200 will produce a different color monochromatic field at position 300 only if point 230, point 260, and the entire plate 200 all lie on a straight line. If plate 200 is parallel to surface 100 (and thus to plate 210), then point 260 is removed to infinity and consequently point 300 and light source 320 are also removed to infinity if each horizontal strip of plate 200 is to contribute a monochromatic field.

When it is desired that the diffractive pattern is to be illuminated by a distant source (effectively at infinity), such as the sun, and that the pattern is to be viewed from a large distance, such as across a street, plate 200 should be parallel to plate 210, and point 230 should be in the extended plane of plate 200. Consequently, plate 110 should be parallel to surface 100.

If the above arrangements are not employed, a vertically varying color distribution will result. If a vertically varying color distribution (such as a full rainbow spectrum) is desired, the relationship between points 260, 160, 320, and 300, as indicated in FIGS. 1, 2, and 3, may be altered.

While it is preferable to generate diffractive patterns with predetermined color distribution by using a simple reference beam and a complex object beam, it is also practical to use a complex reference beam. The essential characteristic of the optical system is that the resulting interference pattern itself should closely resemble a pattern made by the above-described methods. Such an interference pattern is characterized by the diffractive effects it produces: it diffuses light more or less uniformly in the horizontal direction, and it diffuses light in the vertical direction according to an angular distribution which results in a predetermined mix of colors. The light wavefronts whose interference produces such a pattern are characterized by a substantial degree of spatial incoherence in the horizontal direction and a selected distribution of spatial incoherence in the vertical direction. "Spatial incoherence" as used here means a complex spatial phase dependence of high spatial frequency with negligible time dependence.

To form a graphical composition of several textures and colors directly on plate 210, exposures are made on plate 210 using different holograms 200 and masks 240 for each exposure. Separate masks 214 may be used to limit each exposure to a different predetermined region on plate 210 and thereby compose a graphical image or pattern.

The term "graphical composition" as used herein means an arrangement of colored or textured areas on a surface wherein the arrangement itself forms a desired picture, image, or pattern. The color and texture effects described herein are used in much the same way that paints might be used to form such a graphical composition.

If only color effects are desired, hologram 200 in FIG. 2 may be replaced by a diffusing screen. In that case, the only visible texture will be the speckle pattern due to self-interference of the spatially incoherent light emanating from the screen.

Graphical compositions formed from diffractive patterns generated using a diffuser 200 have a wide range of utility and are relativley easier to produce than those formed using a hologram 200.

Diffractive patterns formed as in FIG. 2 are preferably used in a third step, as illustrated in FIG. 4. A mask 420 allows light 430 to pass through diffractive pattern 410 in preselected regions 440 to expose holographic plate 400, thereby contact printing a replica of diffraction pattern 410 onto plate 400 in regions 440. Further exposures may be made onto plate 400 using different patterns 410 and masks 420 to compose a desired graphical pattern. If pattern 410 is in sufficiently close contact with plate 400, the exposure may be made with light from an incandescent or arc light source. However, using a laser light source will avoid numerous problems that can arise, such as might be caused by the presence of dust particles between plates 400 and 410.

Instead of or in addition to masks 420, a graphical pattern may be defined by the method shown in FIG. 5. A conventional projector 540 is used to project a pattern 530 onto holographic plate 400 through diffractive pattern 410. The projector 540 uses light from a source 520 which may be a laser, an arc light, or an incandescent light bulb, to project a transparency onto plates 400 and 410.

Several interesting and useful variations on this technique are possible. For example, if source 520 generates a wide range of colors, such as red, green, and blue, then transparency 500 can be a color image. A filter 550 can select a particular color from source 520, thereby selecting a particular color component of transparency 500. Separate exposures onto plate 400 through separate diffractive patterns 410 thus can produce a true color or pseudocolor copy of the image in transparency 500. Similarly, different color components of transparency 500 may be recorded on plate 400 in different textures but in the same color.

The diffractive effects described above are not exclusively applicable to flat shapes. The essential aspects of the invention are equally applicable to other shapes, such as spheres, toruses, cylinders, cones, and so on. For a textural effect to work well on such shapes, the shape of the real image bearing the desired textural effect should be approximately the same shape as the surface of the photosensitive medium onto which it is imaged. That is, the real image should be conformal to the shape of the photosensitive medium. Furthermore, the terms "vertical" and "horizontal" which are used herein refer to a relationship between the optical system and the diffractive pattern being formed, with "vertical" being the direction orthogonal to "horizontal," and "horizontal" being a direction in the pattern substantially parallel to the line joining an observer's two eyes in the arrangement used to display and view the final graphical composition.

The reference beam used to make the abovedescribed holographic diffractive patterns may be incident upon either side of the photosensitive recording medium. That is, the holographic pattern may be of the front-beam or the back-beam type. However, it is preferable for the pattern to be of the front-beam type for most applications, such as applications wherein the pattern will be replicated as a surface relief pattern.

A specific example of making a graphical composition incorporating diffractive color and texture effects employing the disclosed methods is as follows.

Employing the setup of FIG. 1, a wooden plank is used to provide surface 100 with a wood-grained texture. Plate 110 is a glass plate coated with dichromated gelatin. Exposure is made with 200 millijoules per square centimeter at a beam ratio R:0 of 20:1 using the 4579-Angstrom line of an argon-ion laser. Line 150 is removed to infinity so that plate 110 is parallel to surface 100. Plate 110 is placed 24 inches away from surface 100. After exposure, plate 110 is developed in water and isopropanol to yield a dichromated gelatin hologram.

Then, developed plate 110 is used as plate 200 in FIG. 2. Employing the setup of FIG. 2, a glass plate 210 is coated with AZ 1350 J photoresist and is exposed using a reference source 230 placed so as to form an angle 290 of 35 degrees. Plate 200 is placed 24 inches away from and parallel to plate 210, and is reconstructed with 4579 argon-ion laser light. A mask 240 with a single horizontal transparent strip 280 is placed over plate 200. Strip 280 is located in a direction directly normal to the center of plate 210. Another mask 214, comprising a positive transparency of a photograph of a human face, is placed on plate 210. An exposure of 100 millijoules per square centimeter and a beam ratio R:0 of 1:1 is used. The resist-coated plate is developed for one minute in diluted AZ developer to generate a surface relief interference pattern. The pattern is then vacuum-coated with aluminum to achieve a transmissivity of 2 percent, and finally covered with a glass plate which is attached with ultraviolet-cured optical cement. This graphical composition is viewed reflectively at a distance by illuminating it with a distant spotlight at an angle of 45 degrees. The composition appears as a flat yellow-green image of the human face bearing a wood-grained texture.

Another specific example is as follows:

A set of three transmissive diffractive patterns are made as in the setup of FIG. 2 using a long, narrow horizontal strip of opal glass as a diffuser instead of a hologram for plate 200. Plate 200 is located 12 inches away from an Agfa 8E75 holographic plate 210. A reference source (a microscope objective with a pinhole filter at its focus) is placed so that angle 290 is 38 degrees for the first pattern, 46 degrees for the second pattern, and 58 degrees for the third pattern. Exposure is determined by the plate manufacturer's recommendation, using a helium-neon laser. Each of the three plates is developed in D-19 developer and bleached in iodine-methanol bleach. When the plates are illuminated by a flashlight bulb located at 40 degrees (angle 290 in FIG. 3) at a distance of 17 inches, an observer three feet away sees the first plate as a uniform red field, the second plate as a uniform green field, and the third plate as a uniform blue field. These plates may now be used as contact-printable diffractive patterns.

In another preferred embodiment of the invention, a series of diffractive patterns are first formed in a surface relief medium, such as photoresist or gum bichromate. A metal plate replica of each pattern is formed by electroless deposition of nickel onto the surface relief medium or a replica thereof, followed by electrodeposition of nickel according to techniques well known to those skilled in the art of electroforming. The nickel plates thus formed may be replicated by techniques also well known to those skilled in the art.

Figure 7:
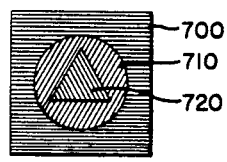
FIG. 7 is a top plan view of the diffractive composition formed by using the plates of FIG. 7 in a hot stamping machine.

A diffractive graphical composition can be formed as an embossing plate using the nickel plate replicas as follows:

First, the replica plates are coated with a photoresist. Regions of the plates are exposed to light and developed to uncover the metal in predetermined patterns. The metal in the uncovered regions is deeply etched 600,630, 660, and the resist is removed from the covered regions 610, 640,670. The resulting plates appear as in FIG. 6, wherein the elevated (unetched) regions bear relief diffractive patterns. These plates may be used as embossing dies in sequence to produce a grpahical composition (as indicated in FIG. 7) combining the shapes 700,710,720 from the various plates.

Alternative ways to emboss diffractive graphical compositions are apparent, such as to form a composition on a single metal plate or to mechanically join parts from different plates to form a single plate. The term "embossing," as used herein, means impressing a relief pattern onto a surface by any means, such casting, molding, hot stamping, or calendaring.

Figure 8:
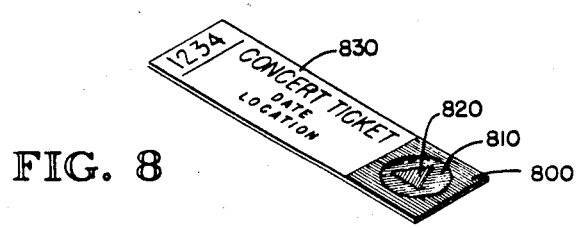
FIG. 8 is an isometric view of a diffractive graphical composition used as an anticounterfeiting device on a concert ticket.

In a further preferred embodiment, the invention is a security device or anticounterfeiting device. Graphical compositions formed from complex diffractive patterns are extraordinarily difficult to counterfeit. They are much more finely detailed than the finest engraving, yet they can easily be recognized by eye. For example, a concert ticket (FIG. 8), stock certificate, or such other item whose value depends on its genuineness may have a particular diffractive graphical composition 800,810,820 embossed therein or affixed thereto. To counterfeit the item would require counterfeiting the diffractive composition, which is not possible by the methods normally employed by printers, such as photocopying.

If the composition is to be viewed by either reflected or transmitted light, and if it is embossed, it may be covered by a transparent coating of a material having a different refractive index than the embossed material. If the composition is to be viewed by reflected light, and is embossed, it may be coated with a thin layer of aluminum or other material to enhance its reflectivity, then overcoated with a transparent material. It is important to "bury" the embossed surface beneath a transparent coating both to protect it from damage and to prevent direct mechanical copying of the embossed pattern. Paper itself is not usually a suitable material to be embossed, but paper coated with a thermoplastic, such as polyethylene, is suitable.

Figure 9:
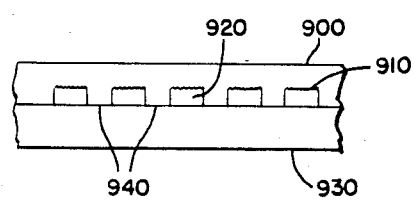
FIG. 9 is an isometric view of an example of a diffractive graphical composition used as a anticounterfeiting device.

If a reflective, embossed, diffractive composition is employed as a security device, it is best protected by a transparent material which adheres strongly. One way to assure strong adhesion while employing a reflective interlayer, such as aluminum, is to remove or displace the interlayer at many points which are small compared to the details of the composition, and to directly fuse a covering layer to the embossed substrate at those points. A way to form a virtually uncounterfeitable, embossed, diffractive composition on a paper substrate (FIG. 9) is to apply a large number of small, noncontiguous dots 920 of embossable material to the substrate 940. Alternatively, a layer of embossable material with multiple connectivity (such as having missing spots) may be applied. The composition is embossed onto the top surface 910 of the embossable material and then aluminized. A transparent overcoat 900 is applied which penetrates the fibers of the paper substrate 930. The resulting structure is very difficult to disassemble without destroying the diffractive pattern.

In some embodiments of the invention, the diffractive graphical pattern may in fact be a three-dimensional hologram and the above-described method of protecting the embossed surface is equally usable on embossed three-dimensional holograms.

In some further embodiments of the invention, the diffractive graphical pattern may "have the form of" a holographically recorded interference pattern while having been generated by non-holographic means, such as mechanical scribing, e-beam writing, or the like. The phrase "having the form of a holographically recorded interference pattern" is intended herein (and within the following claims) to mean having a substantial morphological resemblance and having a substantially similar optical effect as a holographically recorded interference pattern.

The phrase "multiply connected," as used herein, has the meaning it is normally given in the field of general topology.

The forms of the invention disclosed herein constitute preferred embodiments of the invention. Many other forms and embodiments are possible, and it is not possible nor intended herein to illustrate all of the possible equivalent forms, variations, and ramifications of the invention. It will be understood that the words used are words of description rather than limitation, and that various changes, such as changes in shape, relative size, wavelength, orientation, arrangement of parts and steps, recording materials, and recording geometries, may be substituted without departing from the spirit or scope of the invention herein disclosed.

I claim:

1. A method of generating a diffractive pattern producing a predetermined color distribution for use in graphical compositions and decorative effects, comprising:

illuminating a random light diffuser with coherent light in a predetermined pattern of a substantial extent in one direction and a lesser extent in the direction perpendicular thereto;

interfering light diffused by said diffuser with a reference beam at a predetermined angle therefrom, said reference beam having a predetermined structure and being temporally coherent with respect to said coherent light; and placing a photosensitive recording medium in the interference pattern formed by said diffused light and said reference beam to record said interference pattern, thereby forming a diffractive pattern which can widely diffuse light in said one direction and spectrally disperse light in said perpendicular direction.

2. A method of making a diffractive pattern for use in graphical compositions incorporating the diffractive effects of color and texture, comprising:

generating a temporally coherent and spatially incoherent light field randomly diffuse in one direction and having a relatively low degree of randomness in a direction perpendicular to said one direction;

interfering said light field with a reference beam temporally coherent thereto having a predetermined angular relationship to said light field; and recording the interference pattern resulting from the interference between said light field and said reference beam on a photosensitive medium to form a diffractive pattern which will widely diffuse light in said one direction while spectrally dispersing light in a direction perpendicular thereto.

3. A method of making a diffractive pattern appearing as a uniform color field having a predetermined mix of light wavelengths when said pattern is illuminated by a white light source in a predetermined source position and viewed from a predetermined viewing position, comprising:

placing a photosensitive medium and a diffusing screen a predetermined distance apart;

tilting said diffusing screen relative to said medium at an angle which causes the extended plane of said medium to intersect the extended plane of said screen along a predetermined line which does not pass through either said medium or said screen;

positioning a coherent reference point light source on the extended plane of said diffusing screen;

illuminating said diffusing screen by light coherent with said reference light so that diffuse light is thus cast onto said medium;

illuminating said photosensitive medium with light from said coherent reference source to form an interference pattern resulting from coherent superposition of said diffuse light and said reference light; and controlling the distribution of spatial frequencies in said interference pattern and consequently controlling said mix of light wavelengths by controlling the amount of light reaching said photosensitive medium from each strip of said diffusing screen parallel to said line of intersection according to a predetermined function.

4. A graphical composition generated by the following steps, comprising:

making by optical interference at least one diffractive pattern having a selected appearance of color and texture when viewed in a predetermined polychromatic illumination arrangement, said diffractive pattern or patterns being randomly diffuse in one direction, thereby imparting an extended viewing angle in said direction and having a relatively low degree of randomness in a direction perpendicular to said one direction, thereby imparting said selected appearance of color; and recording the interference pattern resulting from the interference between said light field and said reference beam on a photosensitive medium to form a diffractive pattern which will widely diffuse light in said one direction while spectrally dispersing light in a direction perpendicular thereto.

* * * * *